United States Patent Office 2,758,392
Patented Aug. 14, 1956

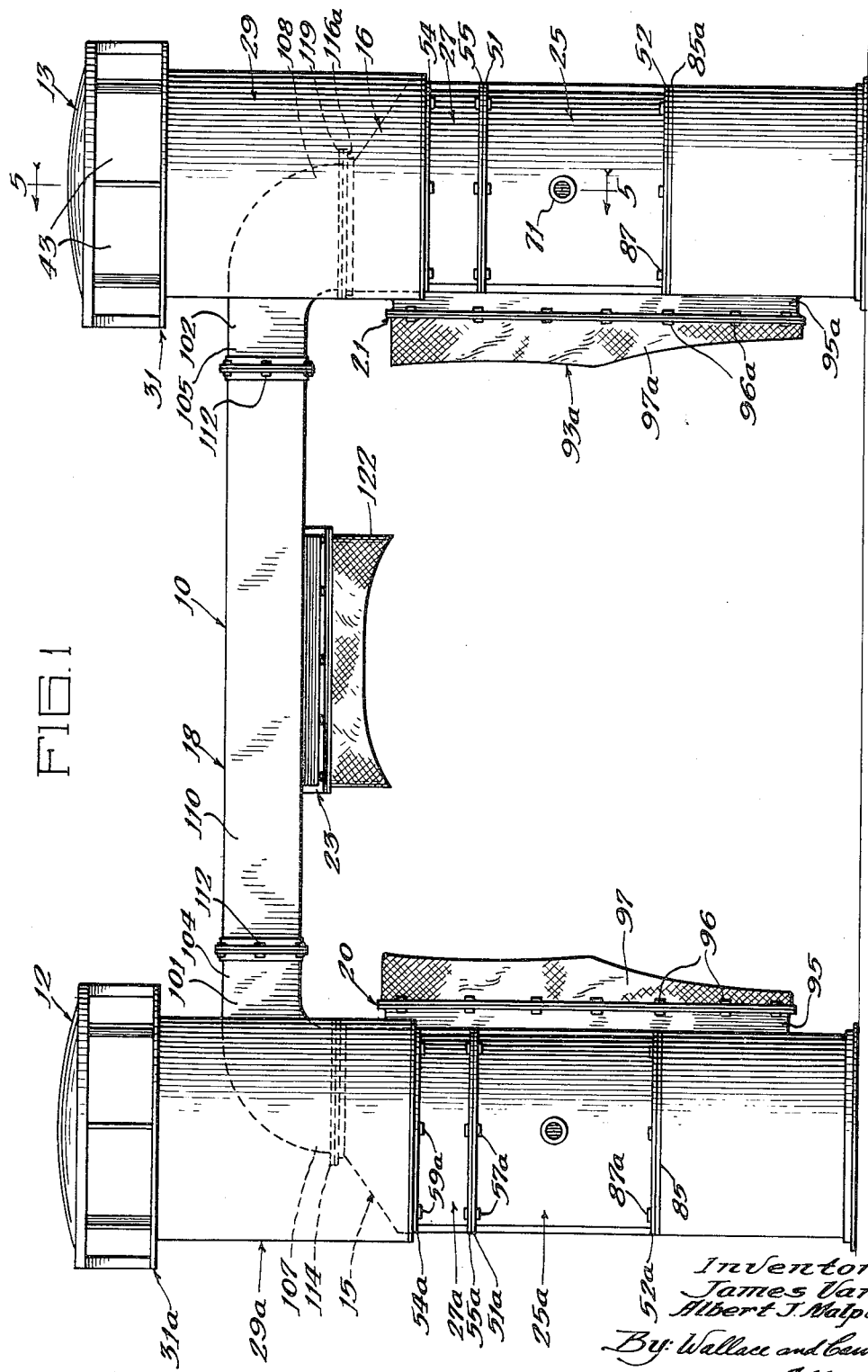

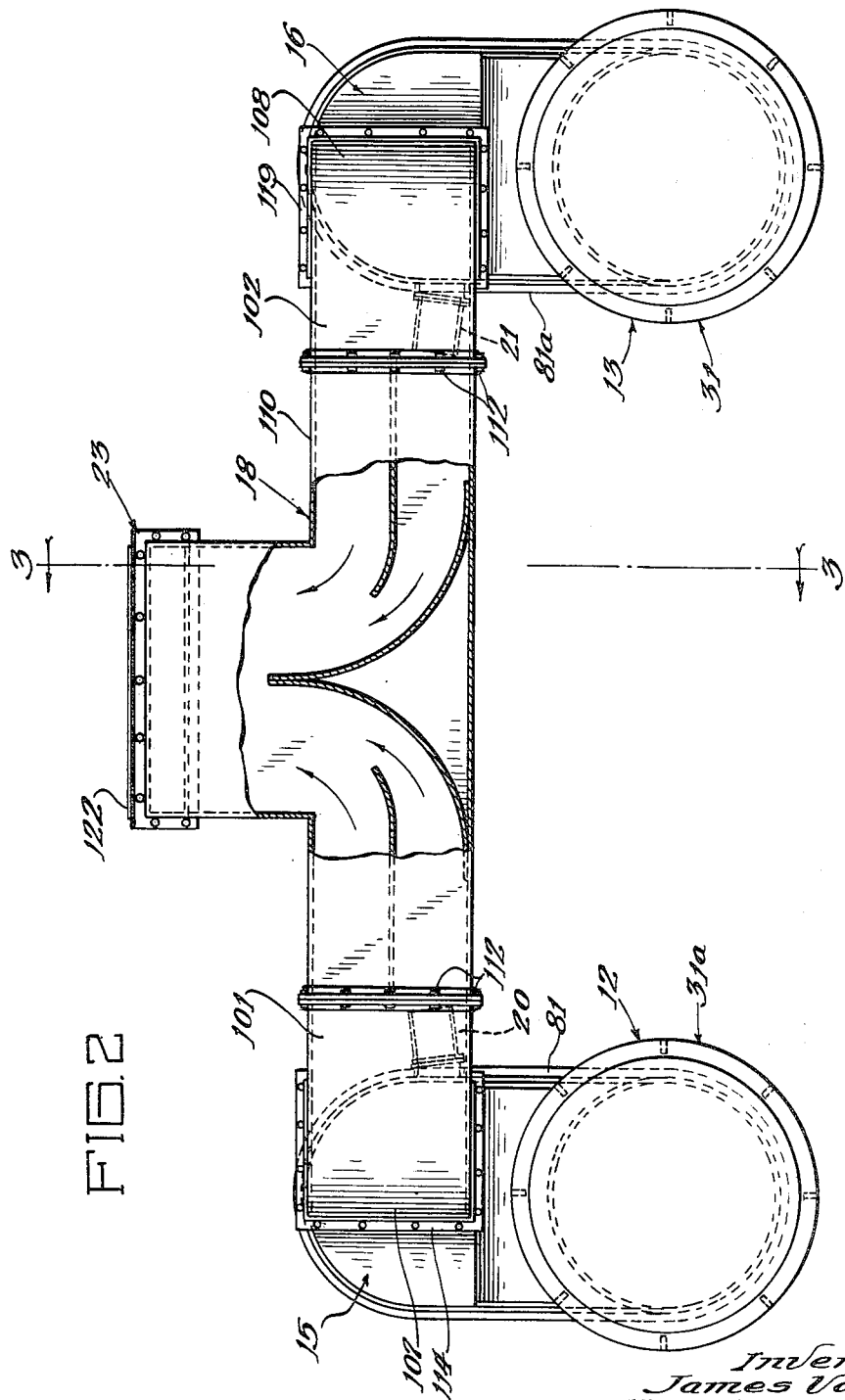

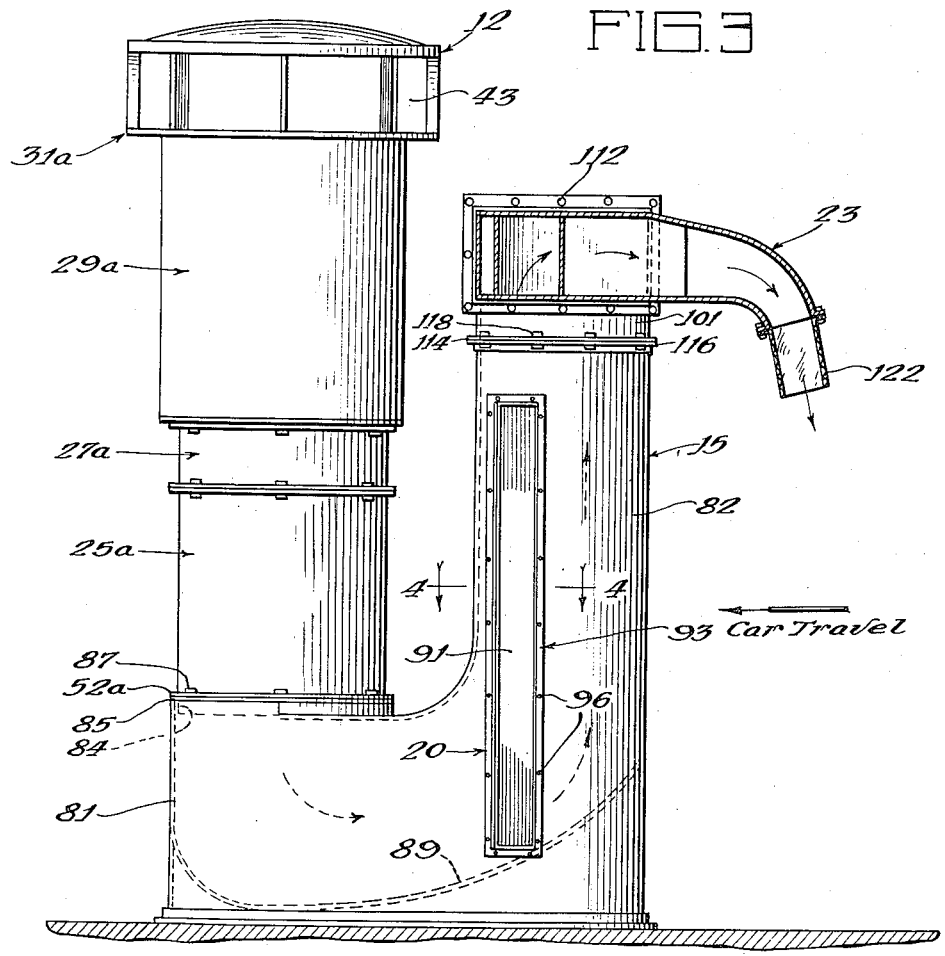
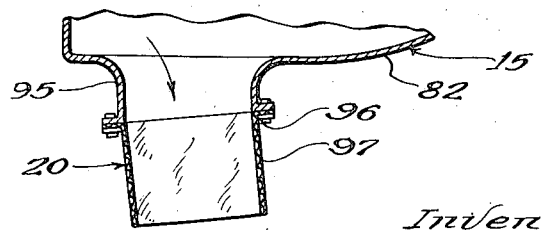

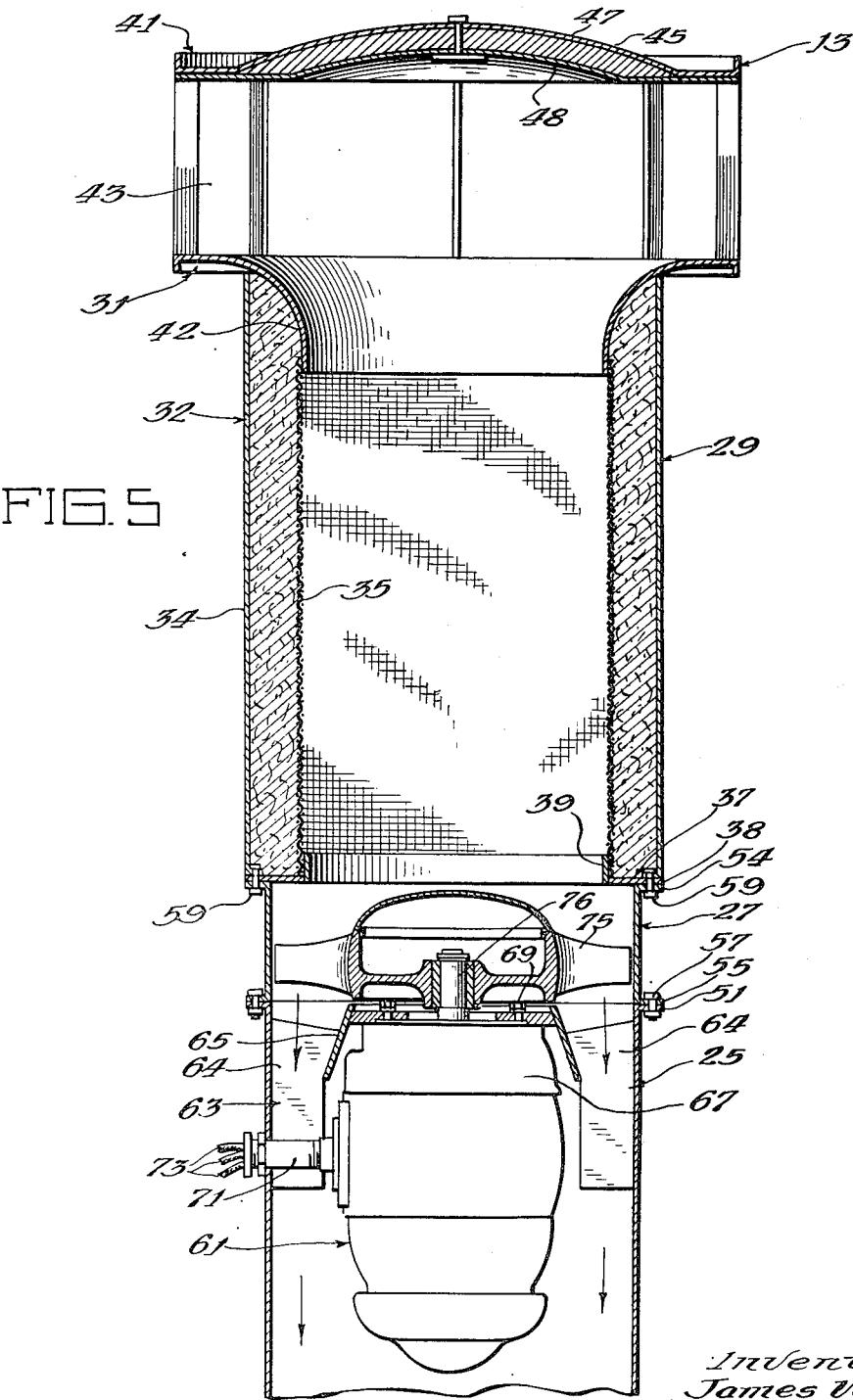

2,758,392

DRIER FOR AUTOMOBILES

James Vani, Midlothian, and Albert J. Malpede, Chicago, Ill., assignors to Service Metal Fabricators, Inc., Chicago, Ill., a corporation of Illinois Application December 23, 1953, Serial No. 399,934

2 Claims. (Cl. 34—229)

This invention relates to drying units and, more particularly, to drying units which are particularly well adapted for drying automobiles, and the like, after the automobiles have been washed.

A primary object of our invention is to afford a drying unit wherein the parts thereof are so constituted and arranged as to make possible the practical use of a high velocity air stream for quickly drying automobiles, and the like, in a novel and expeditious manner, after such automobiles have been washed.

Drying units wherein air is passed thereby over an automobile for the purpose of drying the latter have heretofore been known in the art. However, drying units of this general character which have heretofore been known have had several inherent disadvantages such as, for example, being inefficient in operation; creating noise so intense as to make it impractical if not impossible, for human beings to remain in close enough proximity thereto to effectively operate the same; and using an air stream to drive water off from the automobile rather than evaporate the water and the like. It is one of the important objects of our invention to overcome such disadvantages.

Another object of our invention is to afford a novel drying unit of the aforementioned type which is efficient in operation and in which relatively small power units may be effectively employed for the operation thereof.

Another object is to afford a drying unit of the aforementioned type which employs high velocity air in a novel and expeditious manner.

A further object of our invention is to afford a novel, efficient drier unit employing high-velocity air which is sufficiently quiet in operation that the intensity of the noise created thereby is not such as to render the unit impractical for use in commercial automobile washing shops and the like.

Yet another object of our invention is to afford a novel drier of the aforementioned type with which water may be effectively evaporated from the outer surface of an automobile in a novel and expeditious manner.

Other and further objects of the present invention will be apparent from the following description and claims and are illustrated in the accompanying drawings which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention.

In the drawings:

Fig. 1 is an end elevational view of a dryer unit embodying the principles of our invention;

Fig. 2 is a top plan view of the drying unit shown in Fig. 1 with portions thereof broken away to show the internal construction;

Fig. 3 is a sectional view taken substantially along the line 3—3 in Fig. 2;

Fig. 4 is a detail sectional view taken substantially along the line 4—4 in Fig. 3; and Fig. 5 is a sectional view taken substantially along the line 5—5 in Fig. 1.

To illustrate the principles of our invention a drying unit 10 comprising a preferred embodiment of our invention is shown in the drawings. In general, the drying unit 10, Figs. 1, 2 and 3, embodies two intake towers 12 and 13, two discharge towers 15 and 16, each connected to a respective one of the intake towers 12 and 13 and disposed in substantially parallel relation to each other, a discharge duct 18 interconnecting the upper end portions of the discharge towers 15 and 16, two side nozzles 20 and 21 disposed in the sides of the discharge towers 15 and 16, respectively, and an overhead discharge nozzle 23 extending from the longitudinal central portion of the discharge duct 18.

In the operation of our novel drying unit, as will be discussed in greater detail hereinafter, air is drawn in to the intake towers 12 and 13 from whence it passes into the discharge towers 15 and 16 and the discharge duct 18, and is discharged through the side nozzles 20 and 21 and the overhead nozzle 23 at a relatively high velocity in such a manner that water is quickly and easily removed from the outer surfaces of an automobile which is passed through the archway defined by the two discharge towers 15 and 16 and the discharge duct 18.

The intake tower 13, Figs. 1 and 5, embodies a substantially cylindrical shaped motor housing 25 in the bottom thereof, a fan housing 27 mounted on the upper end of the motor housing 25 and a muffler 29 mounted on the upper end of the fan housing 27.

The muffler 29 embodies an intake head 31 at the upper end portion thereof, the intake head 31 being mounted on the upper end portion of a substantially cylindrical shaped body portion or barrel 32. The barrel 32 of the muffler 29 is a double walled structure embodying an outer shell 34 and an inwardly spaced inner shell 35, Fig. 5. A substantially annular-shaped cap 37 having an annular rim 38 and an axially projecting flange 39, is mounted on the lower end portion of the barrel 32 with the rim 38 disposed in covering relation to the opening between the inner shell 34 and the outer shell 35 and with the flange 39 disposed in the shell 35 in relatively close fitting relation thereto, so as to retain the cap 37 on the lower end portion of the barrel 32.

The head 31 embodies a substantially disk-shaped upper end portion 41 from the lower face of which projects a substantially cylindrical shaped lower portion 42 which, like the flange 39 in the cap 37, is disposed in the inner shell 35 of the barrel 32 in relatively close fitting relation thereto so as to releasably support the head 31 on the barrel 32. The side walls of the lower portion 42 of the head 31 curve outwardly from bottom to top and rest on the upper ends of the shells 34 and 35 of the barrel 32 in position to close the space between the shells 34 and 35 at the upper end of the barrel 32.

The upper end portion 41 and the lower end portion 42 of the head 31 are hollow, and the upper end portion 41 has peripherally disposed intake openings 43, Figs. 1 and 5, formed therein whereby air may flow from the atmosphere inwardly through the intake openings 43 and downwardly through the lower end portion 42 of the head 31 into the barrel 32 of the muffler 29. The top 45 of the upper end portion 41 of the head 31 is also of a double walled construction having an outer shell 47 and an inner shell 48, the central portions of which are disposed in spaced relation to each other, Fig. 5. The space between the outer shell 34 and the inner shell 35 of the barrel 32, and the space between the outer shell 47 and the inner shell 48 of the top 45 of the upper end portion 41 of the head 31, are filled with suitable insulating material such as, for example, glass fiber.

As is best seen in Figs. 1 and 5, the fan housing 27 is substantially cylindrical-shaped and is complementary in shape to the motor housing 25 on which it is mounted. The motor housing 25 has radially projecting flanges 51 and 52 formed on the upper and lower end portions thereof, respectively, and the fan housing 27 likewise has radially projecting flanges 54 and 55 formed on the upper and lower end portions respectively. The fan housing 27 is disposed on the motor housing 25 in such position that the flange 55 rests on the flange 51 and is releasably secured in such position by suitable means such as, for example, bolts 57 which extend through flanges 55 and 51.

The muffler 29 is mounted on the upper end of the fan housing 27 in such position that the cap 37 rests on the flange 54 and is releasably secured thereon by suitable means such as bolts 59 which extend through the flange 54 and the flange 38.

A motor 61 is mounted in the motor housing 25 by a supporting bracket 63 which includes radially inwardly projecting legs 64 mounted on the inner face of the housing 25, and an end plate 65 extending between the members 64. The end plate 65 of the supporting bracket 63 is secured to the end bell 67 of the motor 61 by suitable means such as bolts 69.

A conduit 71 extends through one side of the motor housing 25 and is connected to the motor 61, Fig. 5, and affords a passageway through which electric wires 73 may extend through the housing 25 from a suitable power service, not shown, to the motor 61.

A fan 75 is mounted on the drive shaft 76 of the motor 61 and is disposed in the housing 27. The fan 75 is so shaped that, when it is driven by the motor 61 in normal operation, air is drawn thereby inwardly through the muffler 29 into the fan housing 27 and is discharged downwardly therefrom through the motor housing 25 around the motor 61. Preferably, the fan 75 substantially fills the fan housing 27 whereby a relatively large quantity of air may be fed downwardly thereby with relatively slow rotation of the fan 75.

The intake towers 12 and 13 are identical in construction and parts in the intake tower 12 are identified in the drawings by the same reference numbers as the corresponding parts in the intake tower 13 but with the suffix "a" added thereto.

The discharge tower 15 is of substantially L-shaped construction, Fig. 3, having a substantially horizontally extending base leg 81 and an upright leg 82. Intake opening 84, defined by an annular flange 85, is formed in the upper face of the free end portion of the base leg 81 of the discharge tower 15 and is complementary in size and shape to the lower end portion of the motor housing 25a of the intake tower 12. The motor housing 25a is mounted on the base leg 81 of the discharge tower 15 in such position that the lower flange 52a thereof is mounted on the flange 85 and the intake tower 12 is releasably secured in such position by suitable means such as, for example, bolts 87a which extend through the flanges 52a and 85, Figs. 1 and 3.

The base leg 81 of the discharge tower 15 is hollow, as is the upright leg 82, and is directly connected to the upright leg 82 so that air passing downwardly through the intake opening 34 passes laterally through base leg 81 that is, from left to right, as viewed in Fig. 3, and upwardly into the upright leg 82. A curved baffle plate 89 is mounted in the lower end portion of the base leg 81 and the upright leg 82 to expedite the flow of air from the base leg 81 upwardly into the upright leg 82.

An opening 91 is formed in the side wall of the upright leg 82 and is surrounded by the substantially rectangular shaped discharge nozzle 20 which extends substantially parallel to the longitudinal axis of the upright leg 82. The nozzle 20 may be formed of any suitable material. However, we prefer to form the nozzle 20 of two parts, the part 95 immediately adjacent the upright leg 82, being preferably formed of sheet steel, or the like, as an integral part of the upright leg 82, and the second part, namely, the outer end portion or tip 97 of the nozzle being attached to the part 95 by suitable means such as bolts 96, Figs. 1 and 3, and being formed of material which is sufficiently soft and yielding that it will not scrape or otherwise mar an automobile which might rub against it in the operation of our device. This yieldable material may be any one of a number of suitable fabrics such as, for example, canvas duck or rubber, or the like.

The discharge duct 18 embodies two identical elbows 101 and 102, Fig. 1, each having a discharge end 104 and 105, respectively, and an intake end 107 and 108, respectively, and an intermediate substantially straight elongated duct 110 extending between the elbows 101 and 102 and connected thereto by suitable means such as bolts 112.

The elbow 101 has a flange 114 formed on the intake end thereof, Figs. 1 and 3, which is complementary in size and shape to a flange 116 formed on the upper end portion of the upright leg 82 of the discharge tower 15. The elbow 101 is mounted on the upright leg 82 of the discharge tower 15 in such position that the flange 114 rests on the flange 116, and the elbow 101 is releasably secured in such position by suitable means such as bolts 118 which extend through the flanges 114 and 116.

It will be noted that the discharge tower 16 is identical in construction to the discharge tower 15 except that the discharge nozzle 93 and the base leg 81 project from opposite sides of the discharge tower 16 from that in which the corresponding parts project from the discharge tower 15; in other words the discharge tower 15 and 16 are mirror images of each other. Thus, it is deemed unnecessary to discuss in detail the construction of both the discharge towers 15 and 16, and we have indicated the parts of the discharge tower 16 by the same reference numerals as the corresponding parts in the discharge tower 15 with the suffix "a" added thereto.

The exhaust duct 18 is connected to the discharge tower 16 by the elbow 102, Fig. 1, and it will be noted that the elbow 102 is mounted on the upper end portion of the discharge tower 16 with the flange 119 on the elbow 102 disposed in position on the flange 116a of the discharge tower 16.

The overhead nozzle 23 is substantially rectangular in cross section, Figs. 1, 2 and 3, and extends rearwardly and downwardly from the longitudinal center portion of the intermediate duct 110 of the discharge duct 18. Like the side discharge nozzles 20 and 21 the overhead discharge nozzle 23 is preferably formed in two parts, the part immediately adjacent the discharge duct 110 being formed of any suitable material such as, for example, sheet steel and being preferably formed as an integral part of the duct 110, and the outer or lower end portion 122 being formed of a relatively soft, resilient material as are the end portions 97 and 97a of the discharge nozzles 20 and 21.

The towers 12 and 15 of our novel drying unit 10 are so disposed relative to the towers 13 and 16, respectively, and the discharge duct 18 is so disposed above the ground level, or, in other words, above the horizontal level of the bottom of the towers 12, 13, 15, 16 that an automobile may be driven or otherwise moved forwardly in the direction indicated by the arrow in Fig. 3, between the discharge nozzles 20 and 21 and under the discharge nozzle 23 with the aforementioned nozzles being disposed relatively close to the outer surfaces of such an automobile but without touching the same.

When an automobile which is wet, such as, for example, an automobile which has just been washed, is so moved through our novel driver 10 the latter is operable to quickly and effectively dry the automobile in a novel and expeditious manner. With the novel drying unit 10 constructed in accordance with the principles of our invention, relatively large volumes of air are discharged at high velocity from the nozzles 20, 21 and 23 directly onto the upper and lateral surface of such an automobile.

This large volume of relatively rapidly changing air is effective to quickly evaporate water from the surfaces of the automobile. Also, of course, some of the water is actually blown off of some of the surfaces. However, in addition, water on the sides of automobiles is disposed thereon in globules and in the operation of our novel drier the air is delivered against the surfaces to be dried in such volume and at such velocity that is effective to flatten such globules and render the evaporation thereof especially efficient.

In the preferred embodiment of our novel drier 10 the air is discharged from the nozzles 20, 21 and 23 at approximately five and one-half inches of mercury pressure, at a velocity of approximately one hundred and sixty-five miles per hour, and at a rate of approximately forty thousand cubic feet per minute. As will be appreciated by those skilled in the art, these operating characteristics may be varied somewhat by those skilled in the art without departing from the purview of our invention. However, we have found that for practical, effective operation, without objectionable noise or other undesirable operating characteristics the aforementioned pressure should not be substantially less than five inches of mercury nor substantially more than eight inches of mercury; the aforementioned velocity should not be substantially less than one hundred and thirty-five miles per hour nor substantially more than one hundred and eighty miles per hour; and the aforementioned rate of flow should not be substantially less than thirty thousand cubic feet per minute nor substantially more than fifty thousand cubic feet per minute.

In one form of our novel drier 10 which we deem desirable, the intake towers 12 and 13, the discharge towers 15 and 16, and the discharge duct 18, are constructed of #16 gauge sheet steel; the intake towers 12 and 13 are approximately one hundred and three inches in length, with the motor housing 25, the fan housing 27, and the body portion 32 of the muffler 29, having an internal diameter of approximately twenty-five and one-quarter inches; the space between the housings 34 and 35 of the muffler 29 is preferably approximately four and one-quarter inches in width; the motors 61 and 61a are each twenty-five horsepower and rotate at thirty-six hundred revolutions per minute at full load; the discharge towers 15 and 16 are seventy-four inches high with an over-all transverse length of approximately sixty-one inches; the horizontal legs 81 and 81a of the discharge towers 15 and 16 respectively, have a cross-sectional size of approximately twenty-six and one-half by twenty-nine inches; the vertical legs 82 and 82a of the discharge towers 15 and 16, respectively, have a cross-sectional size of approximately eighteen and one-half by twenty-two inches; the intermediate duct 110 is approximately eighty-eight inches long and has a cross-sectional size of approximately ten by twenty-two inches; the distance between the horizontal legs 81 and 81a of the discharge towers 15 and 16 is approximately nine feet; the nozzles 20 and 21 have a cross-sectional size of approximately nine feet; the nozzles 20 and 21 have a cross-sectional size of approximately five by fifty-four inches and are mounted on the wider (twenty-two and one-half inch) side of the vertical legs 82 and 82a, respectively; and the nozzle 23 has a cross-sectional size of approximately five by thirty-six inches and is mounted on the narrower (ten-inch) side of the intermediate duct 110.

As is best seen in Figs. 2 and 3, the nozzles 20, 21 and 23 are each preferably facing rearwardly at a relatively slight angle, the inward angle of the nozzles 20 and 21 to the horizontal length of the drier 10 being substantially seven degrees, and the rearwardly opening angle of the nozzle 23 to the horizontal being substantially fifteen degrees. The nozzle 23 is preferably so mounted that the discharge end thereof is disposed substantially two inches above the top of the automobile to be dried, and preferably should not be more than ten inches thereabove. The nozzles 20 and 21 are preferably so mounted that the discharge ends thereof are approximately two inches from the sides of the automobile to be dried as the latter passes therebetween in a drying operation, and preferably should not be more than ten inches therefrom. It will be noted that the end portions 97 and 97a of the nozzles 21 and 22, respectively, are shaped so as to generally conform to the shape of the automobile to be passed therebetween, the lower end portions of the end portions 97 and 97a being recessed to receive the fenders of the automobile therebetween as best seen in Fig. 1.

With the drier 10 constructed in accordance with the physical characteristics set forth above, air is discharged from each of the nozzles 20, 21 and 23 at a rate of approximately forty thousand cubic feet per minute, at a pressure of approximately five and one-half inches of mercury, and a velocity of approximately one hundred and sixty-five miles per hour.

With the air being discharged from the nozzles 20, 21 and 23 in this manner it will be seen that an automobile passing therebetween is subjected to a very effective blast of drying air. The air is directed rearwardly at a sufficient angle to tend somewhat to "wipe" or blow the water on the automobile rearwardly, but the angle of the air stream to the main surfaces of the car to be dried is sufficiently direct that the high velocity air also tends to flatten any globules of water to thereby expose a relatively large surface of water to the drying blast of a large volume of air so that drying by evaporation is effectively accomplished.

In the operation of our device, the motors 61 and 61a may be started in operation by closing a switch, not shown, between the wires 73 and the aforementioned source of power. The automobile to be dried may then be moved forwardly by any suitable means such as, for example, pulling, from right to left as viewed in Fig. 3, between the towers 12 and 15 on the one side and the towers 13 and 16 on the other side. After the automobile has passed out from under the nozzle 23 and out from between the nozzles 20 and 21, the operator may turn off the motors 61 and 61a.

Thus it will be seen that we have afforded a novel drier which effectively subjects automobiles to be dried to relatively large volumes of air traveling at high velocity to provide a quickly operating, efficient drier for automobiles and the like.

Furthermore, it will be seen that we have afforded an efficient drier which may be readily and economically produced commercially.

Thus, while I have illustrated and described the preferred embodiment of my invention, it is to be understood that this is capable of variation and modification.

We claim:

1. A drier for automobiles and the like comprising two elongated intake towers, two substantially L-shaped discharge towers, each of said discharge towers having a substantially horizontally extending base leg and an upright leg, each of said intake towers and each of said discharge towers having a passageway therethrough, each of said intake towers being mounted on said base leg of a corresponding one of said discharge towers with said passageways in said last mentioned intake tower and discharge tower disposed in direct communication with each other, an elongated discharge duct interconnecting the upper end portions of said discharge towers, said duct having a longitudinal passageway therethrough disposed in direct communication with said passageways in said discharge towers, each of said discharge towers having an elongated opening in one side of said upright leg thereof and extending substantially parallel to the length of said upright leg, said openings facing substantially toward each other, two outwardly projecting elongated discharge nozzles, each of said nozzles being substantially complementary in size and shape to a respective one of said openings and being disposed on a respective one of said discharge towers in encircling relation to said opening therein, said discharge duct having an elongated opening in one side thereof and extending substantially parallel to the length of said duct, another outwardly projecting discharge nozzle, said other nozzle being substantially complementary in shape to said last mentioned opening and being disposed on said duct in encircling relation to said opening therein, said other nozzle having a downwardly directed discharge orifice, and means mounted in said intake towers for drawing air inwardly into the latter from the atmosphere, feeding such air into said discharge towers and said duct, and discharging such air under pressure through said nozzles to the atmosphere.

2. A drier for automobiles and the like comprising two elongated intake towers, two substantially L-shaped discharge towers, each of said discharge towers having a substantially horizontally extending base leg and an upright leg, each of said intake towers and each of said discharge towers having a passageway therethrough, each of said intake towers being mounted on said base leg of a corresponding one of said discharge towers with said passageways in said last mentioned intake tower and discharge tower disposed in direct communication with each other, an elongated discharge duct interconnecting the upper end portions of said discharge towers, said duct having a longitudinal passageway therethrough disposed in direct communication with said passageways in said discharge towers, each of said discharge towers having an elongated opening in one side of said upright leg thereof and extending substantially parallel to the length of said upright leg, said openings facing substantially toward each other, two outwardly projecting elongated discharge nozzles, each of said nozzles being substantially complementary in size and shape to a respective one of said openings and being disposed on a respective one of said discharge towers in encircling relation to said opening therein, said discharge duct having an elongated opening in one side thereof and extending substantially parallel to the length of said duct, another outwardly projecting discharge nozzle, said other nozzle being substantially complementary in shape to said last mentioned opening and being disposed on said duct in encircling relation to said opening therein, said other nozzle having a downwardly directed discharge orifice, two fans, each of said fans being mounted in a respective one of said intake towers in position to feed air from the atmosphere downwardly through said respective tower upon operative rotation of the respective fan, two motors, each of said motors being mounted in a respective one of said intake towers and connected to said fan in said tower for operatively rotating said fan, said motors being simultaneously operable to thereby simultaneously operatively rotate said fans and feed air downwardly through said intake towers into said discharge towers and said exhaust duct for discharge from said nozzles.

References Cited in the file of this patent

UNITED STATES PATENTS

| | | |
|---|---|---|
| 1,916,908 | Stacey, Jr. et al. | July 4, 1933 |
| 2,440,157 | Rousseau | Apr. 20, 1948 |
| 2,448,834 | Rousseau | Sept. 7, 1948 |
| 2,659,162 | Katz | Nov. 17, 1953 |
| 2,663,951 | Kennison | Dec. 29, 1953 |